United States Patent [19]

Yoshimoto et al.

[11] Patent Number: 5,002,920

[45] Date of Patent: Mar. 26, 1991

[54] CATALYST FOR OZONE DECOMPOSITION

[75] Inventors: Masafumi Yoshimoto; Tadao Nakatsuji; Kazuhiko Nagano, all of Osaka, Japan

[73] Assignee: Sakai Chemical Industry Co., Ltd., Osaka, Japan

[21] Appl. No.: 429,224

[22] Filed: Oct. 31, 1989

[30] Foreign Application Priority Data

Oct. 31, 1988 [JP] Japan ................................. 63-277090
Feb. 14, 1989 [JP] Japan ................................. 1-35304

[51] Int. Cl.$^5$ ....................... B01J 21/06; B01J 23/34; B01J 23/50
[52] U.S. Cl. .................................................... 502/324
[58] Field of Search ......................................... 502/324

[56] References Cited

U.S. PATENT DOCUMENTS 4,085,193  4/1978  Nakajima et al. ............. 502/324 X
4,261,863  4/1981  Kent et al. ...................... 502/324
4,302,360  11/1981  Haruta et al. ................... 502/324

FOREIGN PATENT DOCUMENTS 57-136941  8/1982  Japan ................................. 502/324

Primary Examiner—W. J. Shine
Attorney, Agent, or Firm—Wegner, Cantor, Mueller & Player

[57] ABSTRACT

A catalyst for ozone decomposition which comprises: at least one oxide of a metal selected from the group consisting of Cu, Mn, Co, Fe and Ni; and at least one oxide of a metal selected from the group consisting of Ti and Ag, and/or Au.

A further catalyst freed from deterioration in activity even when it is used under severe conditions, which comprises: a ternary metal oxide represented by the formula of $xMnO_z.yAg_zO.zTiO_z$ wherein weight proportion coordinates (x, y, z) of the oxide on a triangular diagram are either on sides of a triangle formed by connecting three points (20, 10, 70), (80, 10, 10) and (20, 70, 10) with straight lines or within the traingle, as seen in FIG. 1.

1 Claim, 1 Drawing Sheet

CATALYST FOR OZONE DECOMPOSITION

This invention relates to a catalyst for decomposing ozone which is contained, for example, in the air.

There has been proposed various methods of decomposing noxious ozone contained in the air, for example, an adsorption method wherein a porous material is used such as activated carbon or zeolite, or an oxidative decomposition method wherein a catalyst is used such as $MnO_2$.

However, the above mentioned known methods of removing ozone are not satisfactory. The adsorption method has a disadvantage in that an adsorbent must be regenerated since it is limited in adsorption ability. Moreover, maintenance of ozone removing equipments needs much labor and is expensive. The oxidative decomposition method has no such disadvantages as above described, but the known catalysts have no sufficient decomposition activity for ozone.

Therefore, it is an object of the invention to provide a novel catalyst for decomposing ozone, thereby making it possible to establish a method of decomposing ozone which is superior to the prior methods.

The present inventors have made a further investigation of durability of a variety of ozone decomposing catalysts, and found that in general catalysts remarkably deteriorate in activity when they are used under severe conditions of high ozone concentration with large area velocity.

It is, therefore, a further object of the invention to provide a catalyst for decomposing ozone which is freed from deterioration in activity even when it is used under such severe conditions as above described.

Figure 1:
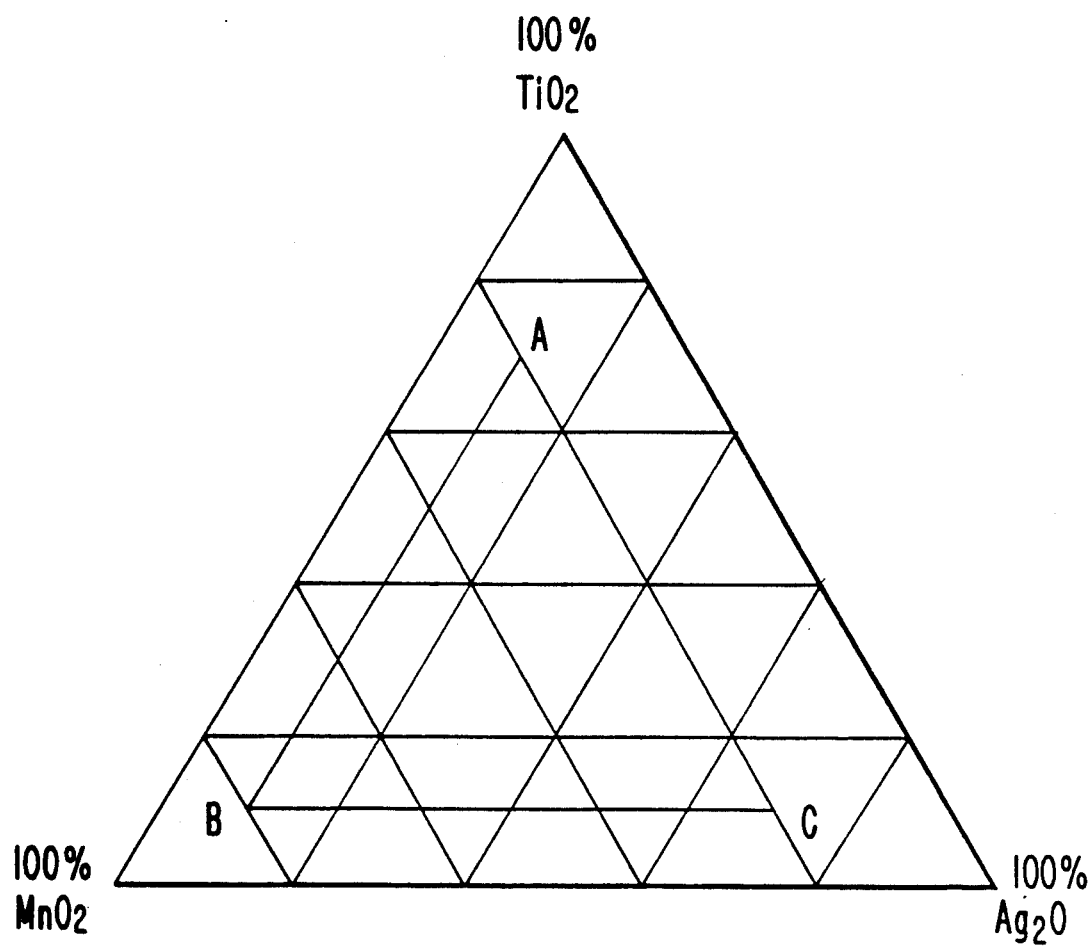
FIG. 1 is a triangular diagram which illustrates the compositions of the ozone decomposition catalyst of the invention.

In accordance with the invention, there is provided a catalyst of decomposing ozone which comprises: at least one oxide of a metal selected from the group consisting of Cu, Mn, Co, Fe and Ni; and at least one oxide of a metal selected from the group consisting of Ti and Ag, and/or Au.

The catalyst which contains, as active components, at least one oxide of a metal selected from the group consisting of Cu, Mn, Co, Fe and Ni; and at least one oxide of a metal selected from the group consisting of Ti and Ag, and/or Au, may be exemplified by binary catalysts such as $MnO_2$-$TiO_2$, $CuO$-$TiO_2$, $Co_3O_4$-$TiO_2$, $Fe_2O_3$-$TiO_2$ or $Fe_2O_3$-$Au$, and ternary catalysts such as $MnO_2$-$Co_3O_4$-$TiO_2$, $MnO_2$-$Co_3O_4$-$Ag_2O$, $MnO_2$-$Ag_2O$-$TiO_2$ or $NiO$-$MnO_2$-$TiO_2$.

The active components are composed of at least one oxide of a metal selected from the group consisting of Cu, Mn, Co, Fe and Ni preferably in amounts of 5-75% (by weight, the same hereinafter) as metals in total, and at least one oxide of a metal selected from the group consisting of Ti and Ag, and/or Au, preferably in amounts of 25-95% as metals.

The catalyst is not specifically limited in form, and the catalyst may be in the form of honeycombs, pellets, cylinders, plates or pipes.

The catalyst contains the active components preferably in amounts of not less than 50%, more preferably in amounts of not less than 75%.

The catalyst may be produced by any known methods such as impregnating, kneading, coprecipitating, precipitating or oxide admixing methods. In the production of the catalyst, molding assistants may be used to provide plasticity with the active component used, reinforcements such as inorganic fibers to increase mechanical strength of the catalyst obtained, or organic binders.

The ozone decomposition may be carried out at temperatures of 0°-40° C., preferably of 10°-30° C. When the reaction temperature is less than 0° C., the reaction velocity is too slow, whereas when more than 40° C., heat energy is needed and this is undesirable from the standpoint of energy economy.

A gas which contains ozone is put into contact with the catalyst at an area velocity of 5-50, wherein the area velocity is defined as a value of space velocity ($hr^{-1}$) divided by gas contact area per unit volume ($m^2/m^3$) of a catalyst. When the area velocity is less than 5, a large volume of catalyst is undesirably needed whereas when more than 50, the ozone decomposition rate is too small.

When ozone is decomposed under mild conditions of a small CA value which is defined as the product of ozone concentration at an inlet of a reactor and area velocity, there takes place substantially no deterioration of the catalyst. However, many catalysts rapidly deteriorate when the reaction is carried out under severe conditions of a CA value of not less than 30.

It has now been found by the present inventors after intensive investigations that among the ozone decomposing catalysts of the invention, a ternary catalyst mainly composed of $MnO_2$-$Ag_2O$-$TiO_2$ of a specific weight proportion is the most durable.

Thus, in accordance with the invention, there is provided an ozone decomposing catalyst which contains a ternary metal oxide represented by the formula of $xMnO_2 \cdot yAg_2O \cdot zTiO_2$ wherein weight proportion co-ordinates (x, y, z) of the oxide on a triangular diagram are either on sides of a triangle formed by connecting three points (20, 10, 70), (80, 10, 10) and (20, 70, 10) with straight lines or within the triangle ABC, as illustrated in FIG. 1. This catalyst of the invention does not deteriorate under severe conditions of a CA value of not less than 30.

The catalyst of the invention may further contain at least one metal selected from the group consisting of Pt, Ru, Re, Os, Rh, Ir and Pd, or an oxide thereof, and/or Au.

The invention will now be described in more detail with reference to examples, however, the invention is not limited thereto.

A.

PREPARATION OF CATALYSTS

EXAMPLE 1

An amount of 704 g of $MnO_2$ having a specific surface area of 48 $m^2/g$ and 250 g of glass beads were added to 1034 ml of titania sol ($TiO_2$ content: 150 g/l), and the resultant mixture was stirred over 30 minutes to provide a slurry.

The slurry was impregnated into a honeycomb formed with corrugates of ceramic fibers having a porosity of 81% and a pitch of 4.0 mm to provide a binary catalyst having $MnO_2$-$TiO_2$ (82/18 in a weight ratio) supported on the honeycomb in a support ratio of 85%, wherein the support ratio is defined as the weight of the active components supported on the honeycomb divided by the weight of the honeycomb.

EXAMPLE 2

An amount of 30 g of $MnO_2$ having a specific surface area of 48 $m^2/g$ and 70 g of anatase $TiO_2$ having a specific surface area of 85 $m^2/g$ were added to 170 ml of titania sol ($TiO_2$ content: 150 g/l), and the resultant mixture was stirred over 30 minutes to provide a slurry.

The slurry was impregnated into the same honeycomb as in the Example 1 to provide a binary catalyst having $MnO_2$-$TiO_2$ (24/76 in a weight ratio) supported thereon in a support ratio of 101%.

EXAMPLE 3

CuO having a specific surface area of 62 $m^2/g$ was used in place of 30 g of $MnO_2$ having a specific surface area of 48 $m^2/g$, and otherwise in the same manner as in the Example 2, a binary catalyst was prepared which had CuO-$TiO_2$ (24/76 in a weight ratio) supported thereon in a support ratio of 91%.

EXAMPLE 4

$Co_3O_4$ having a specific surface area of 53 $m^2g$ was used in place of 30 g of $MnO_2$ having a specific surface area of 48 $m^2/g$, and otherwise in the same manner as in the Example 2, a binary catalyst was prepared which had $Co_3O_4$-$TiO_2$ (24/76 in a weight ratio) supported thereon in a support ratio of 91%.

EXAMPLE 5

$Fe_2O_3$ having a specific surface area of 53 $m^2/g$ was used in place of 30 g of $MnO_2$ having a specific surface area of 48 $m^2/g$, and otherwise in the same manner as in the Example 2, a binary catalyst was prepared which had $Fe_2O_3$-$TiO_2$ (24/76 in a weight ratio) supported thereon in a support ratio of 78%.

EXAMPLE 6

An amount of 500 ml of an aqueous solution of 112 g of manganese acetate (tetrahydrate), 182 g of cobaltous nitrate (hexahydrate) and 63 g of metatitanic acid ($TiO_2$ content: 40%) was prepared. Ammonia water was gradually added to the solution under stirring to neutralize the solution to a pH of 7.0, whereupon slurry precipitates were formed.

The slurry was impregnated into the same corrugated honeycomb as in the Example 1, and the honeycomb was calcined at a temperature of 450° C. for three hours, to provide a ternary catalyst having $MnO_2$-$Co_3O_4$-$TiO_2$ (25/50/25 in a weight ratio) supported thereon in a support ratio of 89% and a specific surface area of 72 $m^2/g$.

EXAMPLE 7

An amount of 500 ml of an aqueous solution of 17.8 g of manganese acetate (tetrahydrate), 282 g of cobaltous nitrate (hexahydrate) and 1.5 g of silver nitrate was prepared. An aqueous solution of ammonium carbonate was gradually added to the solution under stirring to neutralize the solution to a pH of 7.0, whereupon slurry precipitates were formed.

The slurry was impregnated into the same honeycomb as in the Example 1, and the honeycomb was calcined at a temperature of 450° C. for three hours, to provide a ternary catalyst having $Co_3O_4$-$MnO_2$-$Ag_2O$ (20/40/1 in a weight ratio) supported thereon in a support ratio of 92% and a specific surface area of 65 $m^2/g$.

EXAMPLE 8

An amount of 500 ml of an aqueous solution of 74.4 g of cupric nitrate (hexahydrate), 17.8 g of manganese acetate (tetrahydrate) and 1.5 g of silver nitrate was prepared. An aqueous solution of ammonium carbonate was gradually added to the solution under stirring to neutralize the solution to a pH of 7.0, whereupon slurry precipitates were formed.

The slurry was impregnated into the same honeycomb as in the Example 1, and the honeycomb was calcined at a temperature of 450° C. for three hours, to provide a ternary catalyst having CuO-$MnO_2$-$Ag_2O$ (20/40/1 in a weight ratio) supported thereon in a support ratio of 87% and a specific surface area of 71 $m^2/g$.

EXAMPLE 9

An amount of 500 ml of an aqueous solution of 112 g of manganese acetate (tetrahydrate), 195 g of nickel nitrate (hexahydrate) and 63 g of metatitanic acid ($TiO_2$ content: 40%) was prepared. Ammonia water was gradually added to the solution under stirring to neutralize the solution to a pH of 7.0, whereupon slurry precipitates were formed.

The slurry was impregnated into the same honeycomb as in the Example 1, and the honeycomb was calcined at a temperature of 450° C. for three hours, to provide a ternary catalyst having $MnO_2$-NiO-$TiO_2$ (25/50/25 in a weight ratio) supported thereon in a support ratio of 94% and a specific surface area of 80 $m^2/g$.

REFERENCE EXAMPLE 1

An amount of 30 g of $MnO_2$ having a specific surface area of 48 $m^2/g$ and 70 g of a mixture of titanium tetrachloride and silica sol (1/1 in a weight ratio as $TiO_2$/$SiO_2$) were mixed together with stirring while ammonia gas was blown thereinto to neutralize the mixture and provide slurry precipitates.

After fully washing with water, the precipitate was calcined at a temperature of 500° C. for three hours, to provide a binary catalyst composed of $TiO_2$-$SiO_2$ of a specific surface area of 162 $m^2/g$.

EXAMPLE 10

An amount of 250 g of manganese dioxide ($MnO_2$) and 103 g of silver oxide ($Ag_2O$) were added to 1034 ml of titania sol ($TiO_2$ content: 150 g/l). There were further added thereto 250 g of glass beads, and the mixture was stirred to form slurry precipitates.

The slurry was impregnated into the same honeycomb as in the Example 1, to provide a ternary catalyst having $MnO_2$-$Ag_2O$-$TiO_2$ (50/20/30 in a weight ratio) supported thereon in a support ratio of 101%.

EXAMPLE 11

An amount of 1034 ml of titania sol, 155 g of manganese dioxide, 207 g of silver oxide and 250 g of glass beads were used, and otherwise in the same manner as in the Example 10, a ternary catalyst having $MnO_2$-$Ag_2O$-$TiO_2$ (30/40/30 in a weight ratio) supported thereon in a support ratio of 98% was prepared.

EXAMPLE 12

An amount of 2411 ml of titania sol, 103 g of manganese dioxide, 52 g of silver oxide and 250 g of glass beads were used, and otherwise in the same manner as in the Example 10, a ternary catalyst was prepared which had $MnO_2$-$Ag_2O$-$TiO_2$ (20/10/70 in a weight ratio) supported thereon in a support ratio of 105%.

EXAMPLE 13

An amount of 1034 ml of titania sol, 1240 g of manganese dioxide, 155 g of silver oxide and 250 g of glass beads were used, and otherwise in the same manner as in the Example 10, a ternary catalyst was prepared which had $MnO_2$-$Ag_2O$-$TiO_2$ (80/10/10 in a weight ratio) supported thereon in a support ratio of 101%.

EXAMPLE 14

An amount of 1034 ml of titania sol, 310 g of manganese dioxide, 1085 g of silver oxide and 250 of g of glass beads were used, and otherwise in the same manner as in the Example 10, a ternary catalyst was prepared which had $MnO_2$-$Ag_2O$-$TiO_2$ (20/70/10 in a weight ratio) supported thereon in a support ratio of 103%.

EXAMPLE 15

An amount of 1034 ml of titania sol, 78 g of manganese dioxide, 155 g of silver oxide and 250 g of glass beads were used, and otherwise in the same manner as in the Example 10, a ternary catalyst was prepared which had $MnO_2$-$Ag_2O$-$TiO_2$ (20/40/40 in a weight ratio) supported thereon in a support ratio of 99%.

EXAMPLE 16

An amount of 1034 ml of titania sol, 194 g of manganese dioxide, 39 g of silver oxide and 250 g of glass beads were used, and otherwise in the same manner as in the Example 10, a ternary catalyst was prepared which had $MnO_2$-$Ag_2O$-$TiO_2$ (50/10/40 in a weight ratio) supported thereon in a support ratio of 95%.

EXAMPLE 17

An amount of 1034 ml of titania sol, 775 g of manganese dioxide, 620 g of silver oxide and 250 g of glass beads were used, and otherwise in the same manner as in the Example 10, a ternary catalyst was prepared which had $MnO_2$-$Ag_2O$-$TiO_2$ (50/40/10 in a weight ratio) supported thereon in a support ratio of 102%.

EXAMPLE 18

An amount of 1034 ml of titania sol, 465 g of manganese dioxide, 155 g of silver oxide and 250 g of glass beads were used, and otherwise in the same manner as in the Example 10, a ternary catalyst was prepared which had $MnO_2$-$Ag_2O$-$TiO_2$ (60/20/20 in a weight ratio) supported thereon in a support ratio of 102%.

REFERENCE EXAMPLE 2

An amount of 1034 ml of titania sol, 52 g of manganese dioxide, 310 g of silver oxide and 250 g of glass beads were used, and otherwise in the same manner as in the Example 10, a ternary catalyst was prepared which had $MnO_2$-$Ag_2O$-$TiO_2$ (10/60/30 in a weight ratio) supported thereon in a support ratio of 98%.

REFERENCE EXAMPLE 3

An amount of 1034 ml of titania sol, 90 g of manganese dioxide, 13 g of silver oxide and 250 g of glass beads were used, and otherwise in the same manner as in the Example 10, a ternary catalyst was prepared which had $MnO_2$-$Ag_2O$-$TiO_2$ (35/5/60 in a weight ratio) supported thereon in a support ratio of 100%.

REFERENCE EXAMPLE 4

An amount of 1034 ml of titania sol, 1395 g of manganese dioxide, 1550 g of silver oxide and 250 g of glass beads were used, and otherwise in the same manner as in the Example 10, a ternary catalyst was prepared which had $MnO_2$-$Ag_2O$-$TiO_2$ (45/50/5 in a weight ratio) supported thereon in a support ratio.

EXAMPLE 19

The ternary catalyst (water absortion: 39.0%) prepared in the Example 10 was immersed in an aqueous solution of chloroplatinic acid (Pt content: 2.56 g/l). After removal of excess solution therefrom, the catalyst was air dried at normal temperature. Then the catalyst was dried at a temperature of 100° C. over eight hours, and then calcined at a temperature of 500° C. for three hours, to provide a four component catalyst containing platinum in amounts of 0.1% by weight in terms of metallic platinum.

EXAMPLE 20

An aqueous solution of ruthenium trichloride (Ru content: 2.56 g/l) was used in place of the aqueous solution of chloroplatinic acid, and otherwise in the same manner as in the Example 19, a four component catalyst containing ruthenium in amounts of 0.1% by weight in terms of metallic ruthenium was prepared.

EXAMPLE 21

An aqueous solution of rhenium trichloride (Re content: 2.56 g/l) was used in place of the aqueous solution of chloroplatinic acid, and otherwise in the same manner as in the Example 19, a four component catalyst containing rhenium in amounts of 0.1% by weight in terms of metallic rhenium was prepared.

EXAMPLE 22

An aqueous solution of osmium trichloride (Os content: 2.56 g/l) was used in place of the aqueous solution of chloroplatinic acid, and otherwise in the same manner as in the Example 19, a four component catalyst containing osmium in amounts of 0.1% by weight in terms of metallic osmium was prepared.

EXAMPLE 23

An aqueous solution of rhodium trichloride (Rh content: 2.56 g/l) was used in place of the aqueous solution of chloroplatinic acid, and otherwise in the same manner as in the Example 19, a four component catalyst containing rhodium in amounts of 0.1% by weight in terms of metallic rhodium was prepared.

EXAMPLE 24

An aqueous solution of iridium tetrachloride (Ir content: 2.56 g/l) was used in place of the aqueous solution of chloroplatinic acid, and otherwise in the same manner as in the Example 19, a four component catalyst containing iridium in amounts of 0.1% by weight in terms of metallic iridium was prepared.

EXAMPLE 25

An aqueous solution of palladium dichloride (Pd content: 2.56 g/l) was used in place of the aqueous solution of chloroplatinic acid, and otherwise in the same manner as in the Example 19, a four component catalyst containing palladium in amounts of 0.1% by weight in terms of metallic palladium.

EXAMPLE 26

An aqueous solution of auric chloride (Au content: 2.56 g/l) was used in place of the aqueous solution of chloroplatinic acid, and otherwise in the same manner as in the Example 19, a four component catalyst containing gold in amounts of 0.1% by weight in terms of metallic gold.

REFERENCE EXAMPLE 5

The ternary catalyst (water absorption: 41.0%) prepared in the Reference Example 2 was immersed in an aqueous solution of chloroplatinic acid (Pt content: 2.44 g/l). After removal of excess solution therefrom, the catalyst was air dried at normal temperature. Then the catalyst was dried at a temperature of 100° C. over eight hours, and then calcined at a temperature of 500° C. for three hours, to provide a four component catalyst containing platinum in amounts of 0.1% by weight in terms of metallic platinum.

B.

MEASUREMENT OF CATALYST ACTIVITY

Figure 2:
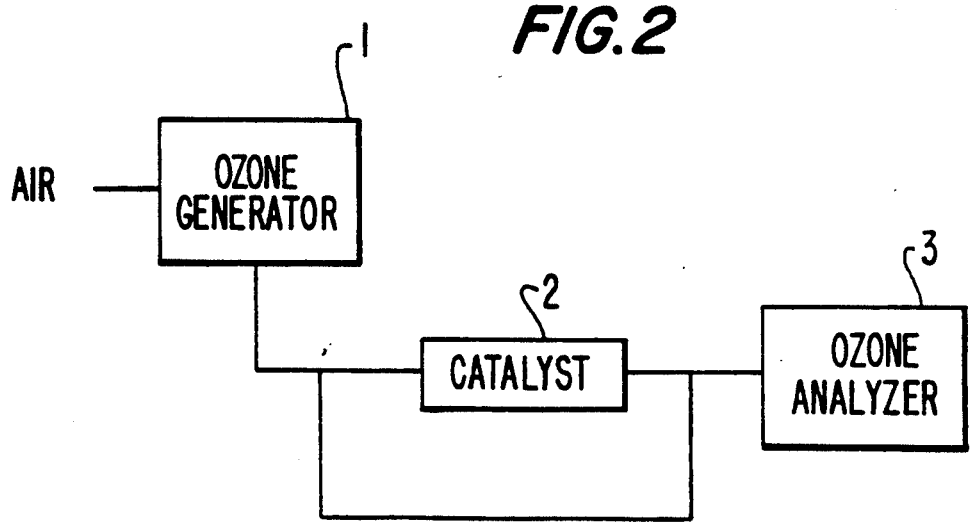
FIG. 2 is a flow sheet for measurement of catalyst activity.

The activity of the catalysts prepared in the Examples 1-26 and the Reference Examples 1-5 was measured in accordance with a flow sheet as shown in FIG. 2, in which 1 designates an ozone generator, into which air is introduced to generate ozone in an appropriate concentration. The air containing ozone is then sent to a catalyst reactor 2. The ozone concentration in the air is determined with an ozone analyzer 3 at the inlet and the outlet of the reactor. Ozone decomposition rate (%) is calculated based on an expression: [(ozone concentration at inlet-ozone concentration at outlet)/ozone concentration at inlet]×100.

The reaction conditions were as follows:

Space velocity: 20000 hr$^{-1}$.
Temperature: 20° C.

In the measurement with the catalysts of the Examples 10-26 and the Reference Examples 2-5, ozone concentration at the inlet of the reactor and area velocity were varied so that CA values were 10, 30 and 50, respectively, and the ozone decomposition rate was measured at the initial stage, after one hour and two hours, respectively, to evaluate durability of the catalyst.

The results are shown in the Tables 1-7.

TABLE 1

| Catalysts | | Compositions (Weight Ratio) | Ozone Decomposition Rate (%) |
|---|---|---|---|
| Example 1 | $MnO_2/TiO_2$ | 82/18 | 96.6 |
| Example 2 | $MnO_2/TiO_2$ | 24/76 | 92.2 |
| Example 3 | $CuO/TiO_2$ | 24/76 | 96.5 |
| Example 4 | $Co_3O_4/TiO_2$ | 24/76 | 93.2 |
| Example 5 | $Fe_2O_3/TiO_2$ | 24/76 | 90.6 |
| Example 6 | $MnO_2/Co_3O_4/TiO_2$ | 25/50/25 | 99.8 |
| Example 7 | $Co_3O_4/MnO_2/Ag_2O$ | 20/40/1 | 100.0 |
| Example 8 | $CuO/MnO_2/Ag_2O$ | 20/40/1 | 100.0 |
| Example 9 | $MnO_2/NiO/TiO_2$ | 25/50/25 | 92.9 |
| Reference 1 | $MnO_2/SiO_2/TiO_2$ | 30/35/35 | 86.8 |

As apparent from the Table 1, the catalysts prepared in the Examples 1-9 have higher ozone decomposition rates than those prepared in the Reference Example 1.

Further, as apparent from the Tables 2-7, the catalysts prepared in the Examples 10-26 do not deteriorate under the conditions of CA values either of 10, 30 or 50. On the contrary, the catalysts prepared in the Reference Examples 2-5 wherein the proportion of the active components are other than those specified in the invention remarkably deteriorate under the conditions of CA values of not less than 30, although the catalysts do not deteriorate under the conditions of a CA value of 10.

TABLE 2

| | | Reaction Conditions | | Ozone Decomposition Rate (%) | | |
|---|---|---|---|---|---|---|
| | | Ozone Concentration at Inlet (ppm) | Area Velocity ($m^3/m^2 \cdot hr$) | | After | |
| | CA* | | | Initial | 1 hour | 2 hours |
| Example 10 | 10 | 1 | 10 | 100 | 100 | 100 |
| | | 5 | 2 | 100 | 100 | 100 |
| | | 10 | 1 | 100 | 100 | 100 |
| | 30 | 1 | 30 | 93.3 | 93.3 | 93.3 |
| | | 5 | 6 | 100 | 100 | 100 |
| | | 10 | 3 | 100 | 100 | 100 |
| | 50 | 1 | 50 | 80.3 | 80.1 | 80.1 |
| | | 5 | 10 | 100 | 100 | 100 |
| | | 10 | 5 | 100 | 100 | 100 |
| Example 11 | 10 | 1 | 10 | 100 | 100 | 100 |
| | | 5 | 2 | 100 | 100 | 100 |
| | | 10 | 1 | 100 | 100 | 100 |
| | 30 | 1 | 30 | 90.9 | 90.8 | 90.7 |
| | | 5 | 6 | 100 | 100 | 100 |
| | | 10 | 3 | 100 | 100 | 100 |
| | 50 | 1 | 50 | 76.3 | 76.1 | 76.0 |
| | | 5 | 10 | 99.9 | 100 | 99.8 |
| | | 10 | 5 | 100 | 100 | 100 |

*(ppm · $m^3/m^2$ · hr)

TABLE 3

| | | Reaction Conditions | | Ozone Decomposition Rate (%) | | |
|---|---|---|---|---|---|---|
| | | Ozone Concentration at Inlet (ppm) | Area Velocity ($m^3/m^2 \cdot hr$) | | After | |
| | CA* | | | Initial | 1 hour | 2 hours |
| Example 12 | 30 | 1 | 30 | 86.4 | 86.3 | 86.3 |
| | | 5 | 6 | 94.7 | 94.8 | 94.8 |

TABLE 3-continued

| | | Reaction Conditions | | Ozone Decomposition Rate (%) | | |
|---|---|---|---|---|---|---|
| | | Ozone Concentration at Inlet (ppm) | Area Velocity ($m^3/m^2 \cdot hr$) | Initial | After 1 hour | After 2 hours |
| | CA* | | | | | |
| Example 13 | 30 | 10 | 3 | 95.2 | 95.1 | 95.1 |
| | | 1 | 30 | 92.5 | 92.5 | 92.3 |
| | | 5 | 6 | 98.6 | 98.5 | 98.5 |
| Example 14 | 30 | 10 | 3 | 97.8 | 97.9 | 97.8 |
| | | 1 | 30 | 83.7 | 83.6 | 83.6 |
| | | 5 | 6 | 93.9 | 93.9 | 94.0 |
| Example 15 | 30 | 10 | 3 | 94.2 | 94.3 | 94.2 |
| | | 1 | 30 | 82.3 | 82.3 | 82.3 |
| | | 5 | 6 | 93.8 | 93.8 | 93.8 |
| Example 16 | 30 | 10 | 3 | 93.5 | 93.4 | 93.4 |
| | | 1 | 30 | 92.5 | 92.4 | 92.4 |
| | | 5 | 6 | 98.1 | 97.9 | 97.9 |
| Example 17 | 30 | 10 | 3 | 97.6 | 97.8 | 97.7 |
| | | 1 | 30 | 93.3 | 93.2 | 93.0 |
| | | 5 | 6 | 98.9 | 98.9 | 98.9 |
| | | 10 | 3 | 98.3 | 98.2 | 98.2 |

*(ppm · $m^3/m^2$ · hr)

TABLE 4

| | | Reaction Conditions | | Ozone Decomposition Rate (%) | | |
|---|---|---|---|---|---|---|
| | | Ozone Concentration at Inlet (ppm) | Area Velocity ($m^3/m^2 \cdot hr$) | Initial | After 1 hour | After 2 hours |
| | CA* | | | | | |
| Example 18 | 30 | 1 | 30 | 94.2 | 94.1 | 94.1 |
| | | 5 | 6 | 98.6 | 98.5 | 98.5 |
| | | 10 | 3 | 98.9 | 98.8 | 98.8 |
| Example 19 | 30 | 1 | 30 | 95.5 | 95.5 | 95.4 |
| | | 5 | 6 | 99.4 | 99.3 | 99.3 |
| | | 10 | 3 | 99.3 | 99.3 | 99.3 |
| Example 20 | 30 | 1 | 30 | 97.1 | 96.9 | 96.9 |
| | | 5 | 6 | 99.3 | 99.3 | 99.3 |
| | | 10 | 3 | 99.5 | 99.4 | 99.5 |
| Example 21 | 30 | 1 | 30 | 97.1 | 97.0 | 97.1 |
| | | 5 | 6 | 99.5 | 99.5 | 99.5 |
| | | 10 | 3 | 99.3 | 99.3 | 99.2 |
| Example 22 | 30 | 1 | 30 | 95.5 | 95.5 | 95.5 |
| | | 5 | 6 | 99.3 | 99.1 | 99.1 |
| | | 10 | 3 | 99.2 | 99.2 | 99.2 |
| Example 23 | 30 | 1 | 30 | 96.7 | 96.5 | 96.5 |
| | | 5 | 6 | 99.6 | 99.6 | 99.6 |
| | | 10 | 3 | 99.5 | 99.5 | 99.5 |

*(ppm · $m^3/m^2$ · hr)

TABLE 5

| | | Reaction Conditions | | Ozone Decomposition Rate (%) | | |
|---|---|---|---|---|---|---|
| | | Ozone Concentration at Inlet (ppm) | Area Velocity ($m^3/m^2 \cdot hr$) | Initial | After 1 hour | After 2 hours |
| | CA* | | | | | |
| Example 24 | 30 | 1 | 30 | 96.3 | 96.2 | 96.2 |
| | | 5 | 6 | 99.3 | 99.2 | 99.2 |
| | | 10 | 3 | 99.5 | 99.2 | 99.2 |
| Example 25 | 30 | 1 | 30 | 95.2 | 95.1 | 95.2 |
| | | 5 | 6 | 99.2 | 99.0 | 99.0 |
| | | 10 | 3 | 99.4 | 99.2 | 99.2 |
| Example 26 | 30 | 1 | 30 | 97.1 | 97.0 | 97.0 |
| | | 5 | 6 | 99.6 | 99.6 | 99.6 |
| | | 10 | 3 | 99.5 | 99.4 | 99.4 |
| Reference 2 | 10 | 1 | 10 | 99.9 | 86.8 | 71.1 |
| | | 5 | 2 | 100 | 100 | 99.8 |
| | | 10 | 1 | 100 | 100 | 100 |
| | 30 | 1 | 30 | 90.0 | 49.1 | 33.9 |
| | | 5 | 6 | 100 | 96.9 | 87.4 |
| | | 10 | 3 | 100 | 99.9 | 98.4 |
| | 50 | 1 | 50 | 74.9 | 33.3 | 22.0 |
| | | 5 | 10 | 99.9 | 86.8 | 71.1 |
| | | 10 | 5 | 100 | 98.3 | 91.7 |

*(ppm · $m^3/m^2$ · hr)

TABLE 6

| | | Reaction Conditions | | Ozone Decomposition Rate (%) | | |
|---|---|---|---|---|---|---|
| | | Ozone Concentration at Inlet (ppm) | Area Velocity ($m^3/m^2 \cdot hr$) | Initial | After 1 hour | After 2 hours |
| | CA* | | | | | |
| Reference 3 | 10 | 1 | 10 | 99.8 | 70.9 | 57.1 |
| | | 5 | 2 | 100 | 99.8 | 98.6 |
| | | 10 | 1 | 100 | 100 | 100 |
| | 30 | 1 | 30 | 87.0 | 33.7 | 25.6 |
| | | 5 | 6 | 100 | 87.2 | 75.6 |
| | | 10 | 3 | 100 | 98.4 | 94.1 |
| | 50 | 1 | 50 | 70.6 | 21.9 | 15.6 |
| | | 5 | 10 | 99.8 | 70.9 | 57.1 |
| | | 10 | 5 | 100 | 91.5 | 81.6 |
| Reference 4 | 10 | 1 | 10 | 99.9 | 85.9 | 73.9 |
| | | 5 | 2 | 100 | 100 | 99.9 |
| | | 10 | 1 | 100 | 100 | 100 |
| | 30 | 1 | 30 | 89.1 | 47.9 | 36.1 |
| | | 5 | 6 | 100 | 96.2 | 89.3 |
| | | 10 | 3 | 100 | 99.9 | 98.9 |
| | 50 | 1 | 50 | 73.6 | 32.4 | 23.5 |
| | | 5 | 10 | 99.9 | 85.9 | 73.9 |
| | | 10 | 5 | 100 | 98.0 | 93.2 |

*(ppm · $m^3/m^2$ · hr)

TABLE 7

| | | Reaction Conditions | | Ozone Decomposition Rate (%) | | |
|---|---|---|---|---|---|---|
| | | Ozone Concentration at Inlet (ppm) | Area Velocity ($m^3/m^2 \cdot hr$) | Initial | After 1 hour | After 2 hours |
| | CA* | | | | | |
| Reference 5 | 10 | 1 | 10 | 100 | 88.4 | 74.4 |
| | | 5 | 2 | 100 | 100 | 99.9 |
| | | 10 | 1 | 100 | 100 | 100 |
| | 30 | 1 | 30 | 94.2 | 51.2 | 36.5 |
| | | 5 | 6 | 100 | 97.2 | 89.7 |
| | | 10 | 3 | 100 | 99.9 | 98.9 |

*(ppm · $m^3/m^2$ · hr)

What is claimed is:

1. A catalyst for ozone decomposition which comprises: a ternary metal oxide represented by the formula of $xMnO_z \cdot yAg_zO \cdot zTiO_z$ wherein weight proportion coordinates (x, y, z) of the oxide on a triangular diagram are either on sides of a triangle formed by connecting three points (20, 10, 70), (80, 10, 10) and (20, 70, 10) with straight lines or within the triangle ABE, as seen in FIG. 1.

* * * * *